(12) United States Patent
Meurrens

(10) Patent No.: US 8,059,194 B2
(45) Date of Patent: Nov. 15, 2011

(54) IMAGE SENSOR INSPECTION AND CLEANING DEVICE

(75) Inventor: Peter Meurrens, Burnaby (CA)

(73) Assignee: Parkside Optical Inc., Vancouver (CA)

( * ) Notice: Subject to any disclaimer, the term of this patent is extended or adjusted under 35 U.S.C. 154(b) by 363 days.

(21) Appl. No.: 12/235,490

(22) Filed: Sep. 22, 2008

(65) Prior Publication Data

US 2010/0073548 A1 Mar. 25, 2010

(51) Int. Cl.
*H04N 5/225* (2006.01)

(52) U.S. Cl. ......... 348/375; 348/373; 396/429; 396/544

(58) Field of Classification Search ........................ None
See application file for complete search history.

(56) References Cited

U.S. PATENT DOCUMENTS

| 2008/0075452 | A1 | | 3/2008 | Parkola |
| 2009/0094771 | A1 | * | 4/2009 | Wordhouse ..................... 15/214 |

FOREIGN PATENT DOCUMENTS

| JP | 2005292404 A | * | 10/2005 |
| JP | 2008096538 A | | 4/2008 |
| JP | 2009130613 A | * | 6/2009 |
| WO | 2008/039309 A3 | | 4/2008 |
| WO | 2008151414 A1 | | 12/2008 |

OTHER PUBLICATIONS

"Rob Galbraith DPI: VisibleDust now taking pre-orders for Sensor Loupe". Apr. 20, 2007. Web printed on Jun. 23, 2009. <http://www.robgalbraith.com/bins/content_page.asp?cid=7-8738-8944>.
"Sensor Lupe and Sensor Cleaner [DL-SLCK] : Dot Line Corp., Serving You Since 1963". Web printed on Jun. 17, 2009. <http://dotlinecorp.net/index.php?main_page=product_info&products_id=6937>.
"SensorVu Loupe [DL-SL]:Dot Line Corp., Serving You Since 1963". Web printed on Jun. 16, 2009. <http://dotlinecorp.net/index.php?main_page=product_info&cPath=1121&products_id=6837>.
"VisibleDust—DSLR Camera Sensor Cleaning". VisibleDust. Viewed Aug. 21, 2008. Web printed on Jun. 4, 2009. <http://www.visibledust.com/>.
"VisibleDust—Product Page". Viewed Aug. 21, 2008. Web printed on Jun. 23, 2009. <http://www.visibledust.com/products3.php?pid=602>.
"VisibleDust—Sensor Loupe Comparison". Viewed Aug. 21, 2008. Web printed on Jun. 23, 2009. <http://www.visibledust.com/sensorloupecompare.php>.
"VisibleDust—Product Page". Viewed Aug. 21, 2008. Web printed on Jun. 23, 2009. <http://www.visibledust.com/products3.php?pid=600>.

* cited by examiner

*Primary Examiner* — David Ometz
*Assistant Examiner* — Angel L Garces-Rivera
(74) *Attorney, Agent, or Firm* — Oyen Wiggs Green & Mutala LLP

(57) ABSTRACT

A loupe for use in conjunction with a digital SLR camera. The loupe is designed to couple to the lens mount of a camera to enable detection of any dust particles or other debris present on camera's image sensor. The loupe has a tubular housing having an access window slot formed therein to permit insertion of a cleaning tool into the interior of the housing to clean the image sensor while the loupe remains coupled to the camera. The invention thereby permits a user to more easily see dust particles or other debris on the image sensor during the cleaning operation.

22 Claims, 24 Drawing Sheets

IMAGE SENSOR INSPECTION AND CLEANING DEVICE

TECHNICAL FIELD

This application relates to a device for inspecting and cleaning the image sensor of a digital SLR camera.

BACKGROUND

Digital single reflex (dSLR) cameras include image sensors for capturing photographic images. The image sensors may, for example, comprise a charge-coupled device (CCD). If dust or other debris is present on an image sensor, it may also be visible on the resultant photographic image. This is particularly troublesome in the case of ultra-high resolution images. Accordingly, dSLR image sensors should be periodically cleaned for optimum camera performance. For example, the dust particles may be removed using hand-held cleaning tools, such as cleaning brushes or swabs. A suitable cleaning tool is marketed by the applicant under the trademark SENSORKLEAR™.

Some magnifying scopes and loupes are known in the prior art to assist in inspecting image sensors to visualize dust particles or other debris present thereon. For example, U.S. patent application Ser. No. 11/529,667 published 27 Mar. 2008 as 20080075452 describes an image sensor inspection device which includes a tubular housing having a lens and lighting assembly mounted therein. The housing may be coupled to the camera body to illuminate the image sensor and help identify the location of any dust particles or other debris.

VisibleDust of Edmonton, Alberta is also marketing a similar product under the trademark SENSOR LOUPE™ which includes a tubular body adapted to fit dSLR cameras of different sizes.

A serious shortcoming of such prior art devices is that the scope or loupe used for inspection purposes must be removed from the camera in order to clean the image sensor. Since some dust particles are very small, in many cases it is difficult to visualize the particles after the scope or loupe has been removed during the cleaning operation. Accordingly, several iterations of alternating viewing and cleaning may be required in order to effectively clean the sensor.

The need has therefore arisen for a dSLR loupe which can remain coupled to the camera body to more easily see dust particles or other debris during the cleaning operation.

The foregoing examples of the related art and limitations related thereto are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

In accordance with the invention, a device for use in conjunction with a camera having a lens mount and an image sensor is provided, the device including a housing having a lower portion sized to engage the lens mount; a magnifying lens mounted within an interior of the housing; and an illumination source mounted on the housing for illuminating the image sensor, wherein the housing comprises a cut-out slot to permit insertion of a cleaning tool therethrough, the device thereby enabling cleaning of the image sensor with the cleaning tool while the housing remains in engagement with the lens mount.

In another embodiment of the invention, the invention relates to a kit comprising the device as described above in combination with the cleaning tool. In one embodiment the cleaning tool is a hand-held instrument for manually engaging the image sensor. The instrument may include an articulating joint for adjusting the angle of a lower portion of the instrument relative to an upper portion of the instrument.

In a further embodiment of the invention the invention relates to a method of cleaning an image sensor of a camera comprising the steps of providing an inspection device comprising a housing and a magnifying lens mounted within the housing, the housing having a slot formed therein; coupling the inspection device to the camera; inserting a cleaning tool through the slot while maintaining the device in engagement with the camera; and cleaning the image sensor with the tool while viewing the image sensor through the magnifying lens.

In addition to the exemplary aspects and embodiments described above, further aspects and embodiments will become apparent by reference to the drawings and by study of the following detailed descriptions.

BRIEF DESCRIPTION OF DRAWINGS

Exemplary embodiments are illustrated in referenced figures of the drawings. It is intended that the embodiments and figures disclosed herein are to be considered illustrative rather than restrictive.

In drawings which illustrate embodiments of the invention, but which should not be construed as restricting the spirit or scope thereof.

DESCRIPTION

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

Figures 1A, 1B:
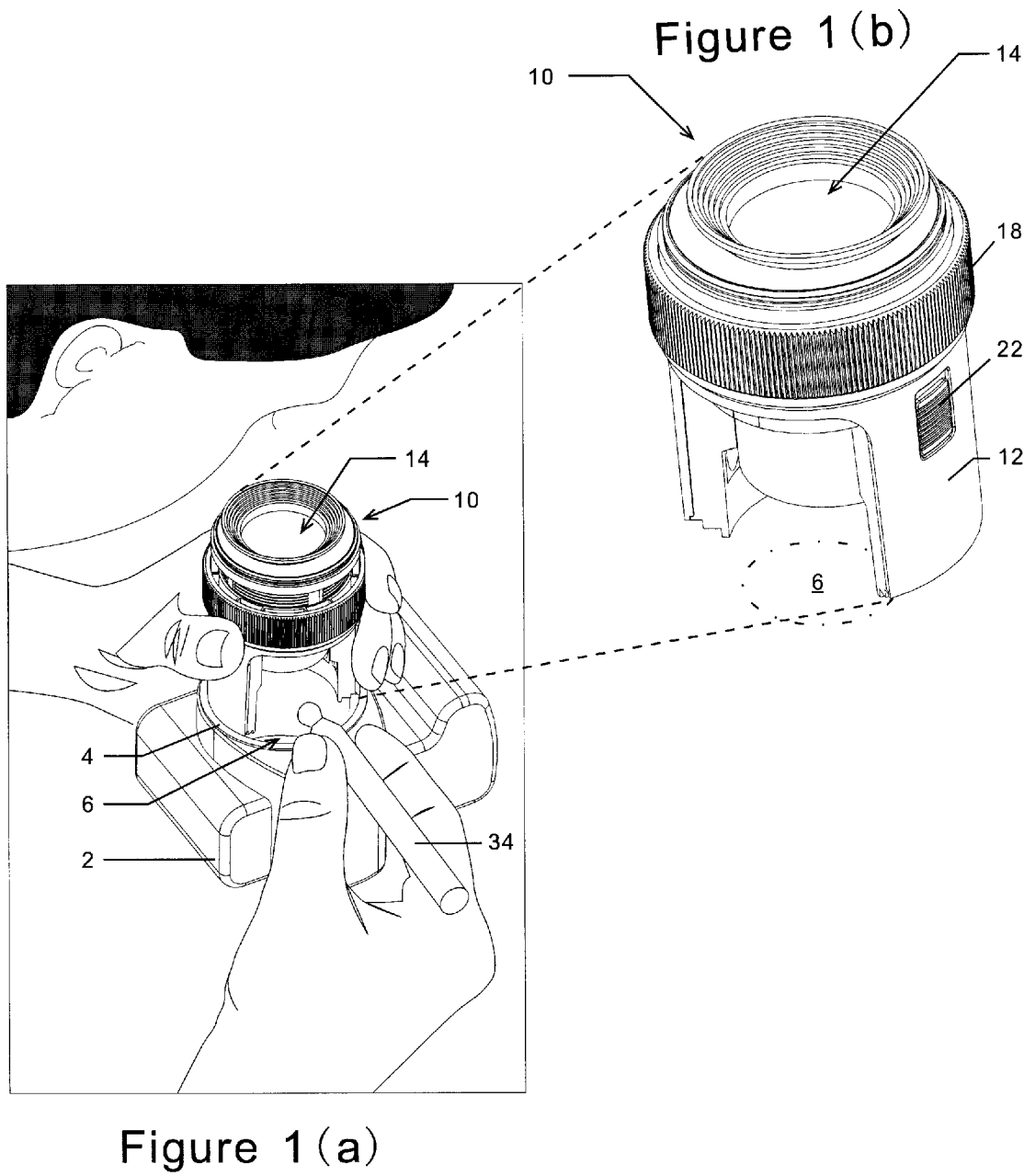
FIG. 1(a) is a perspective view of the applicant's loupe and hand-held cleaning instrument in use for inspecting and cleaning the image sensor of a digital camera.
FIG. 1(b) is an enlarged perspective view of the loupe of FIG. 1(a)

This application relates to a loupe 10 for use in conjunction with a dSLR camera 2. As shown in FIG. 1(a), camera 2 may include a lens mount 4 and an image sensor 6. As shown in FIGS. 1(a) and 15-18, and as described below, loupe 10 is designed to couple to lens mount 4 and illuminate sensor 6 to enable detection and cleaning of any dust particles or other debris present on sensor 6.

Figure 11:
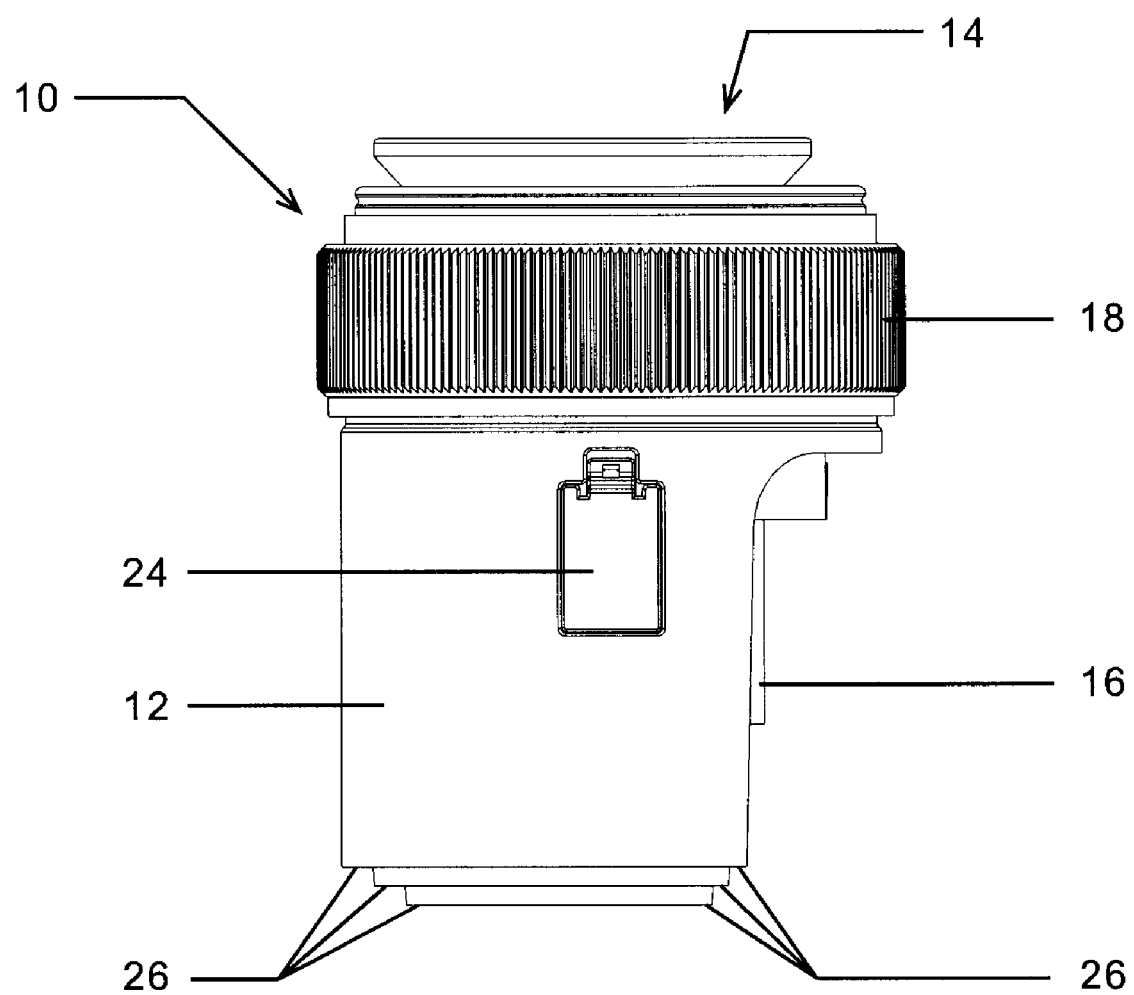
FIG. 11 is a left side view of the loupe of FIG. 5 with the eyepiece cap removed.
Figure 12:
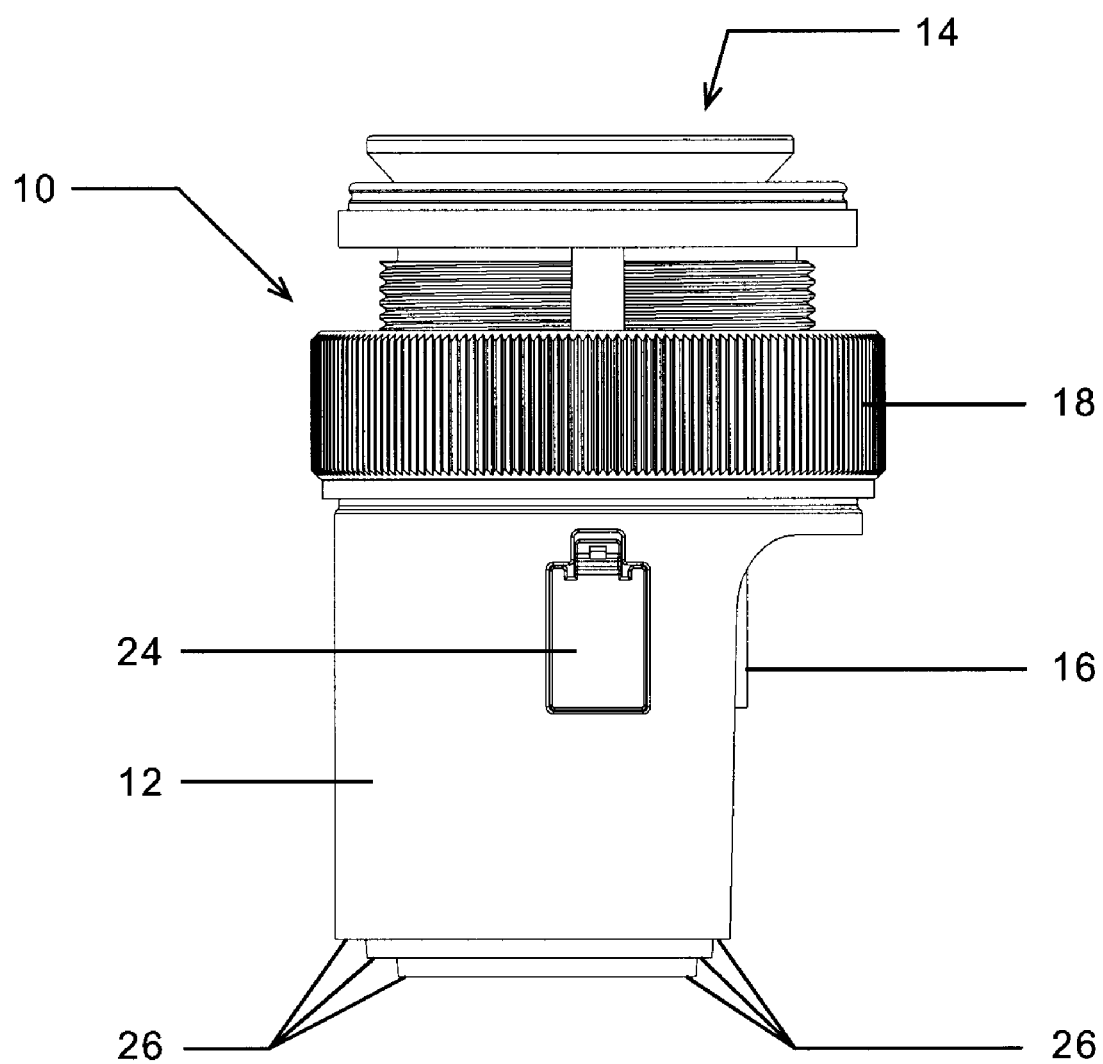
FIG. 12 is a left side view of the loupe of FIG. 11 with the position of the lens barrel adjusted.
Figure 13:
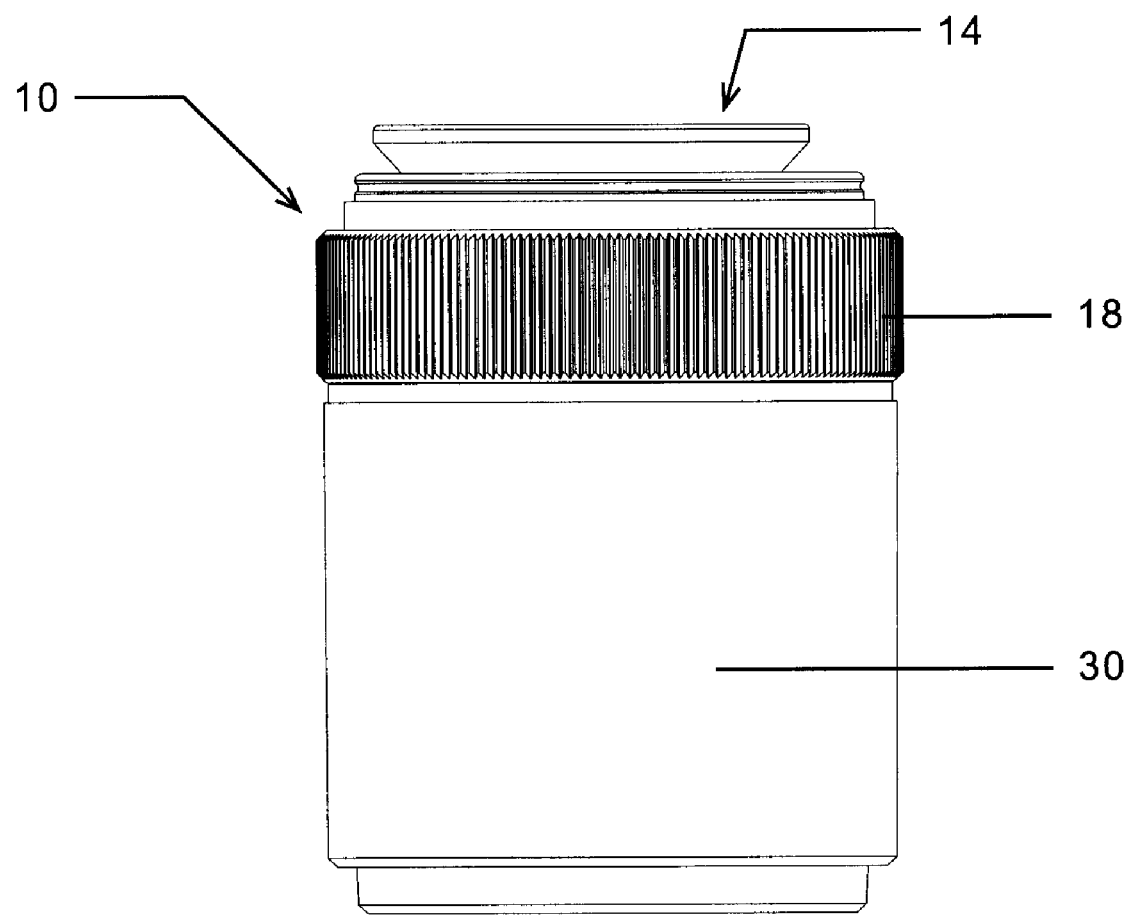
FIG. 13 is a side view of the loupe of FIG. 9 inserted within a protective sleeve with the eyepiece cap removed.
Figure 14:
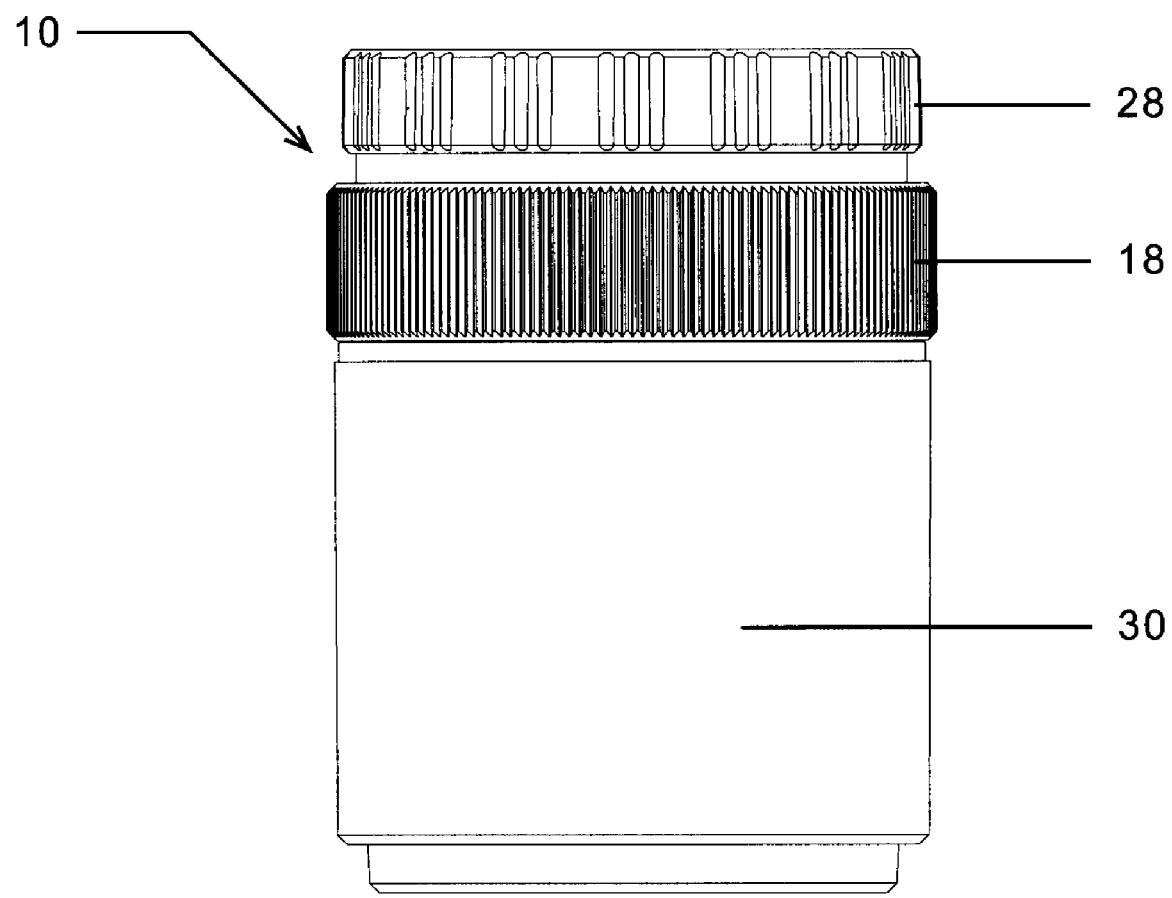
FIG. 14 is a side view of the loupe of FIG. 9 with the eyepiece cap in place.
Figure 15:
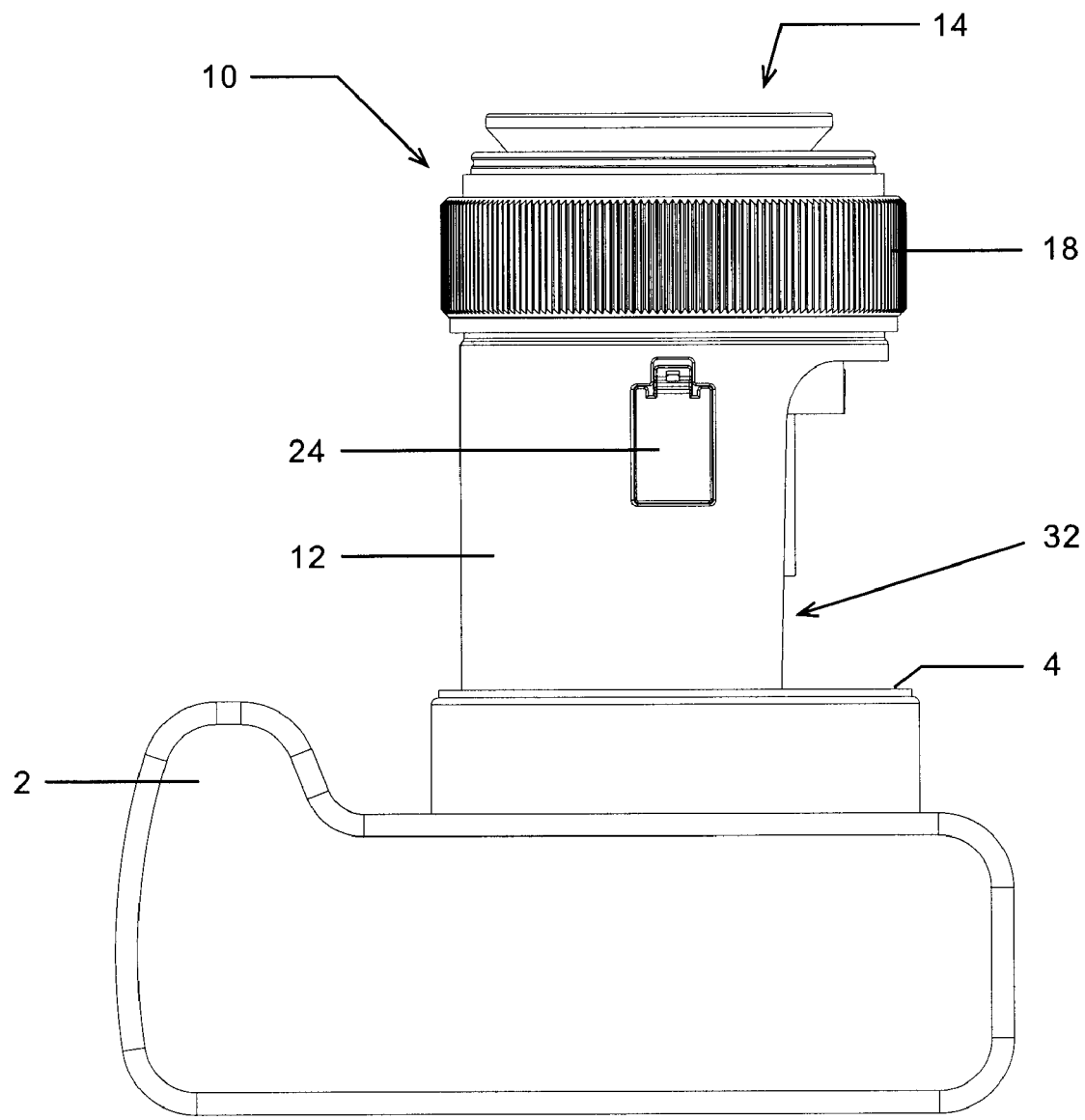
FIG. 15 is a left side view of the loupe mounted on a camera body.

Loupe 10 includes a generally tubular housing 12 having a lens 14 located therein. Lens 14 is mounted within a barrel 16 which is height adjustable within housing 12. The position of barrel 16 may be adjusted by turning adjustment ring 18. In one embodiment of the invention, barrel 16 may be threadedly coupled to housing 12 to enable adjustment of the barrel height. FIGS. 11 and 12, for example, show barrel 16 adjusted to two different positions.

Figure 3:
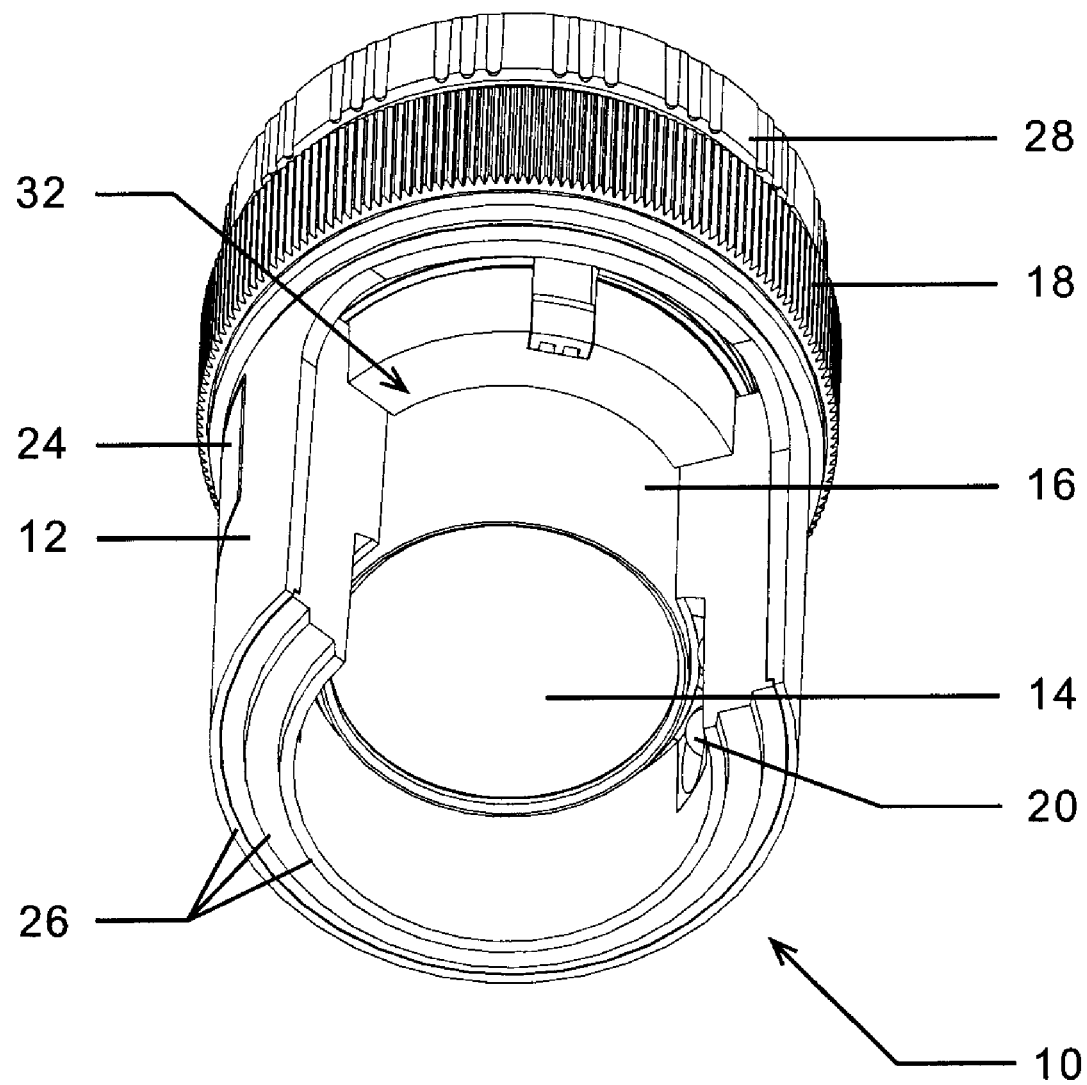
FIG. 3 is a bottom isometric view of a loupe constructed in accordance with the invention.
Figure 4:
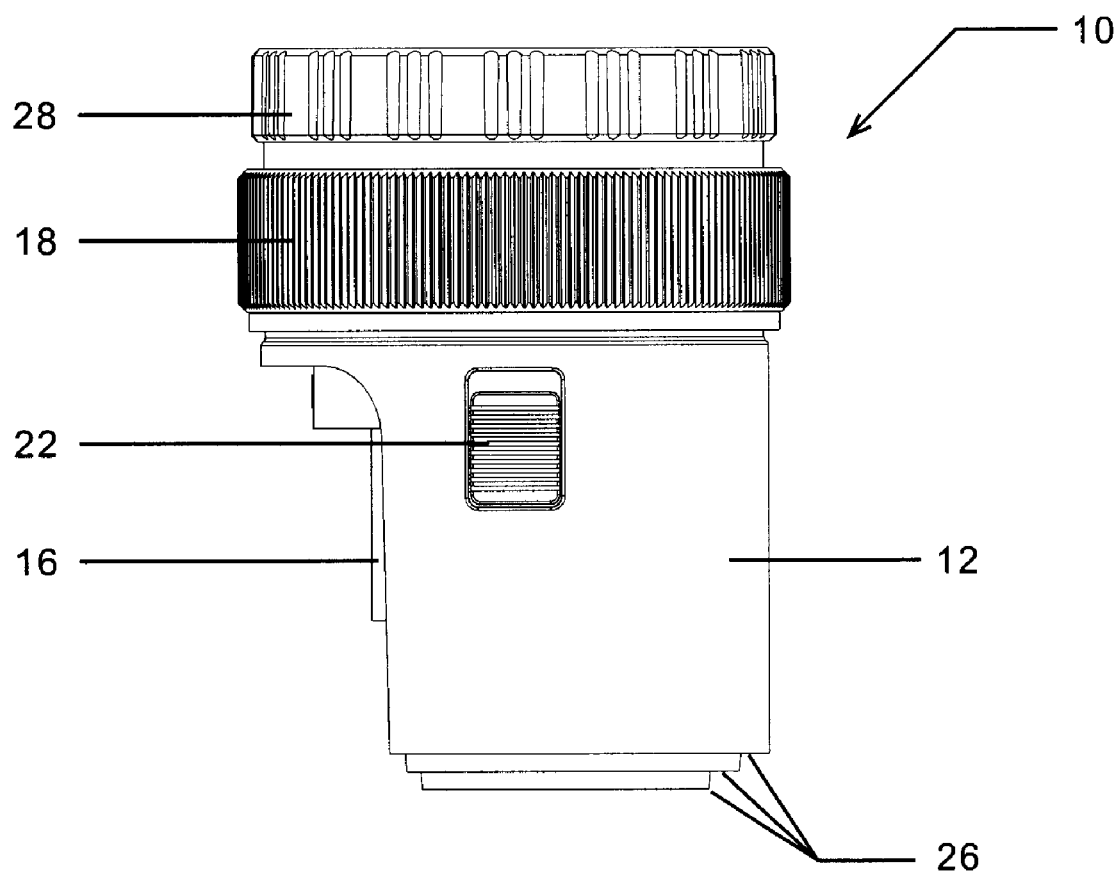
FIG. 4 is a right side view thereof.
Figure 5:
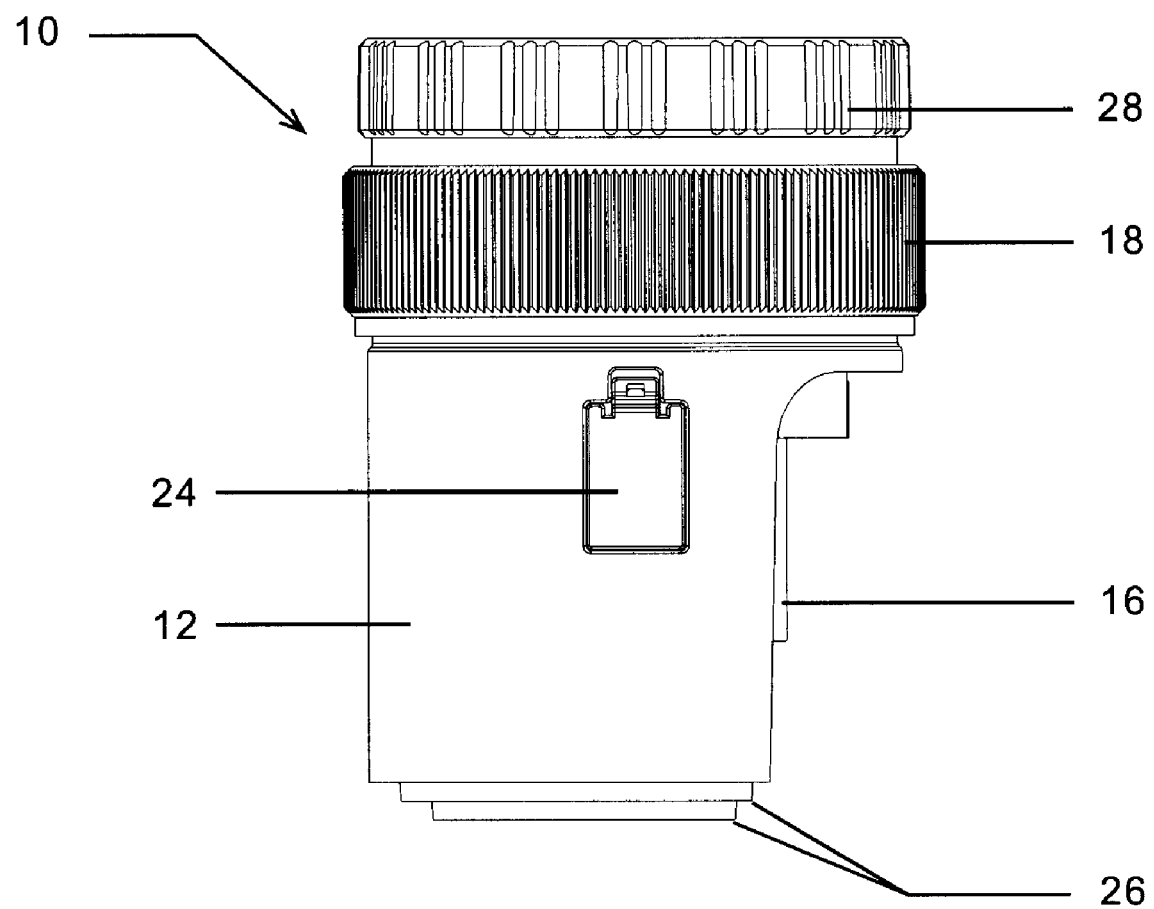
FIG. 5 is left side view thereof.
Figure 6:
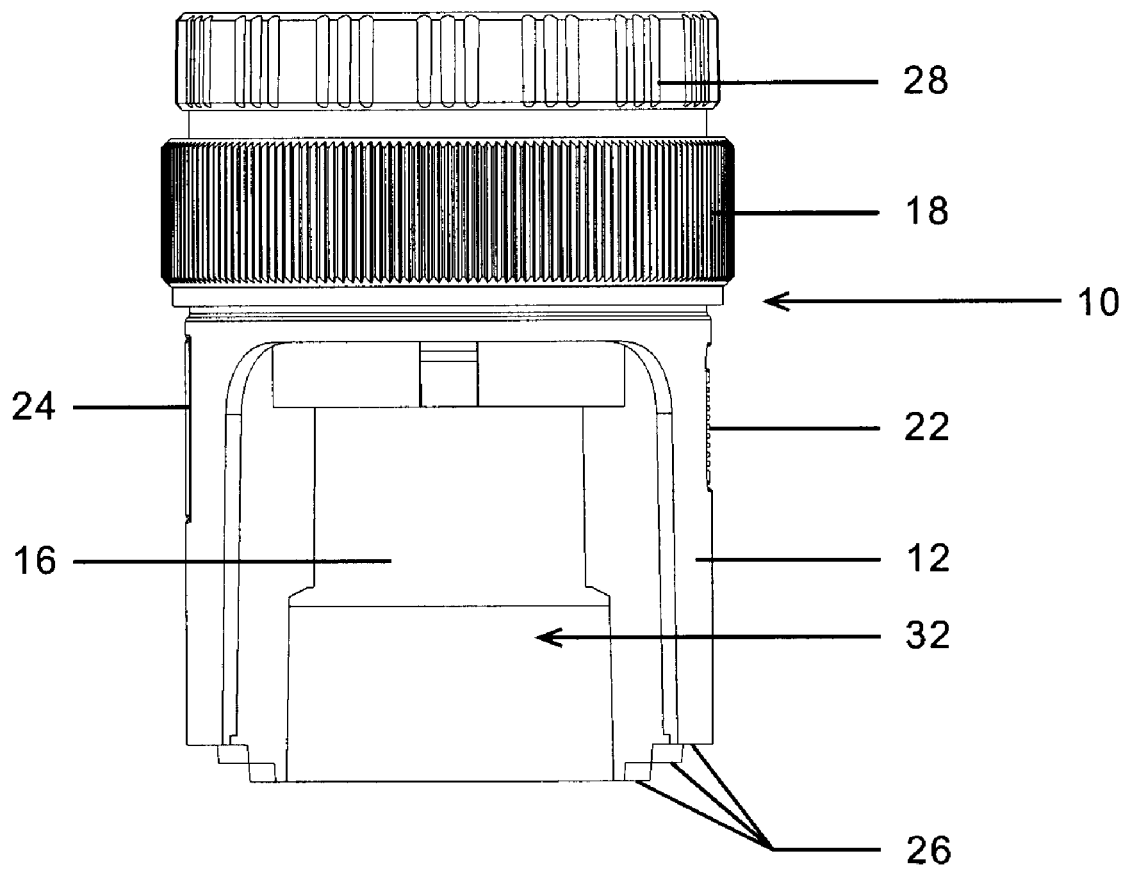
FIG. 6 is a front view thereof.
Figure 7:
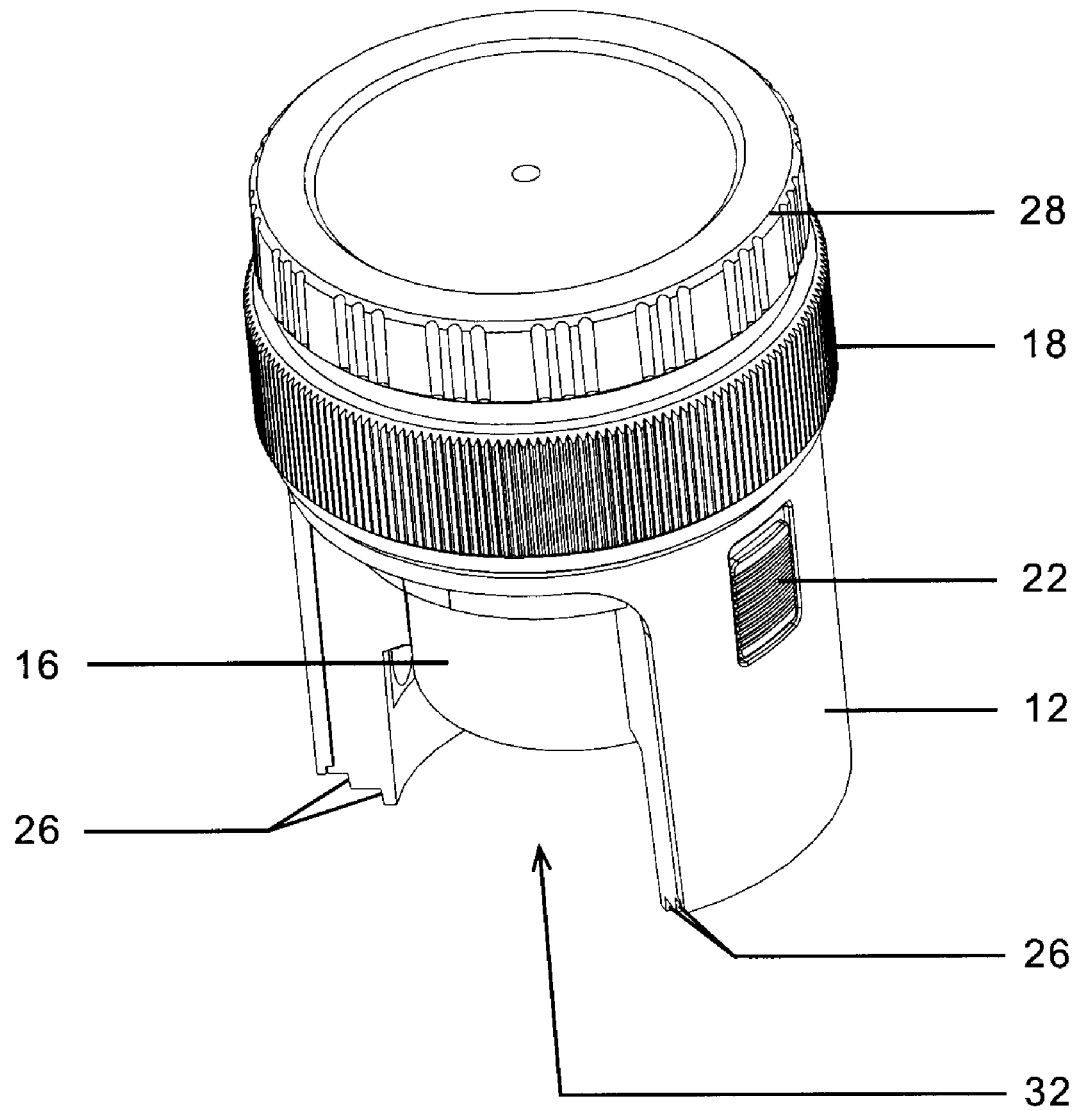
FIG. 7 is a right, upper isometric view thereof.
Figure 8:
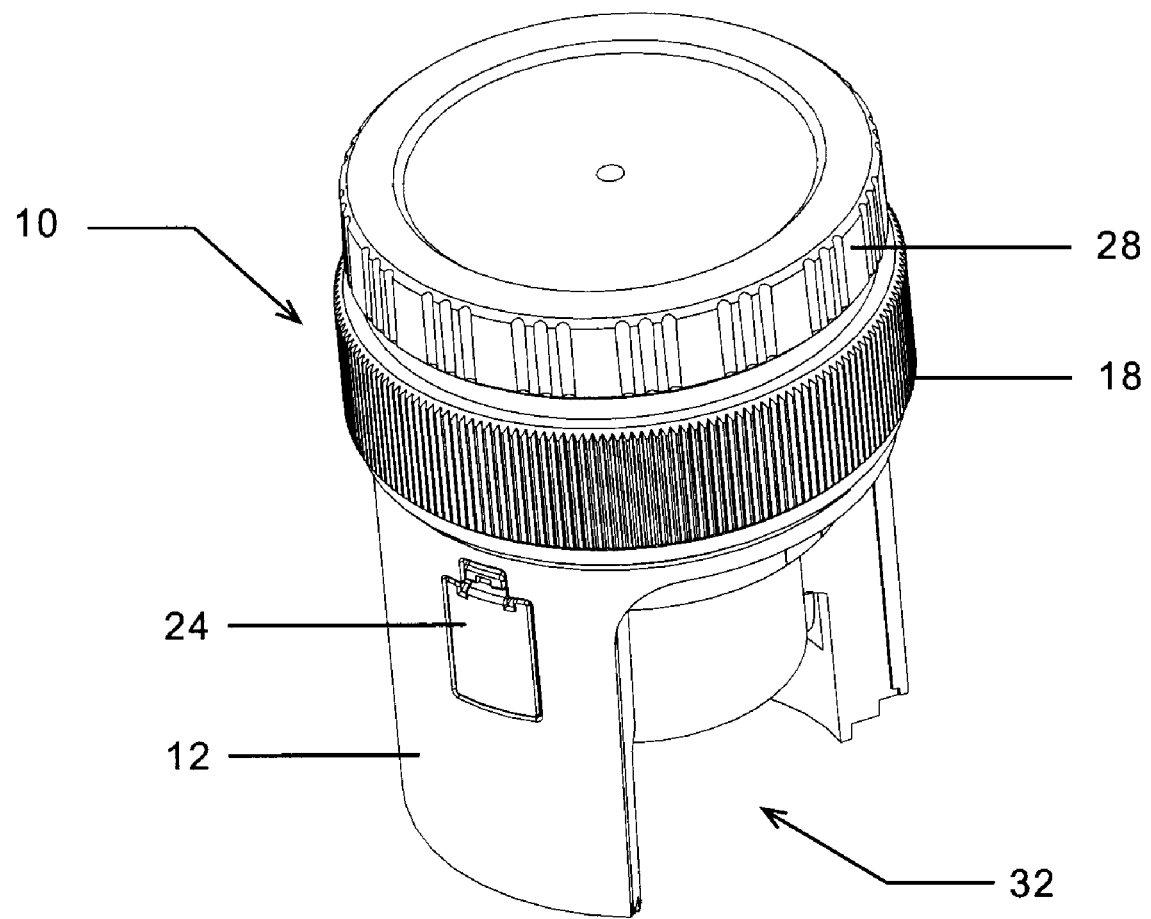
FIG. 8 is a left, upper isometric view thereof.
Figure 9:
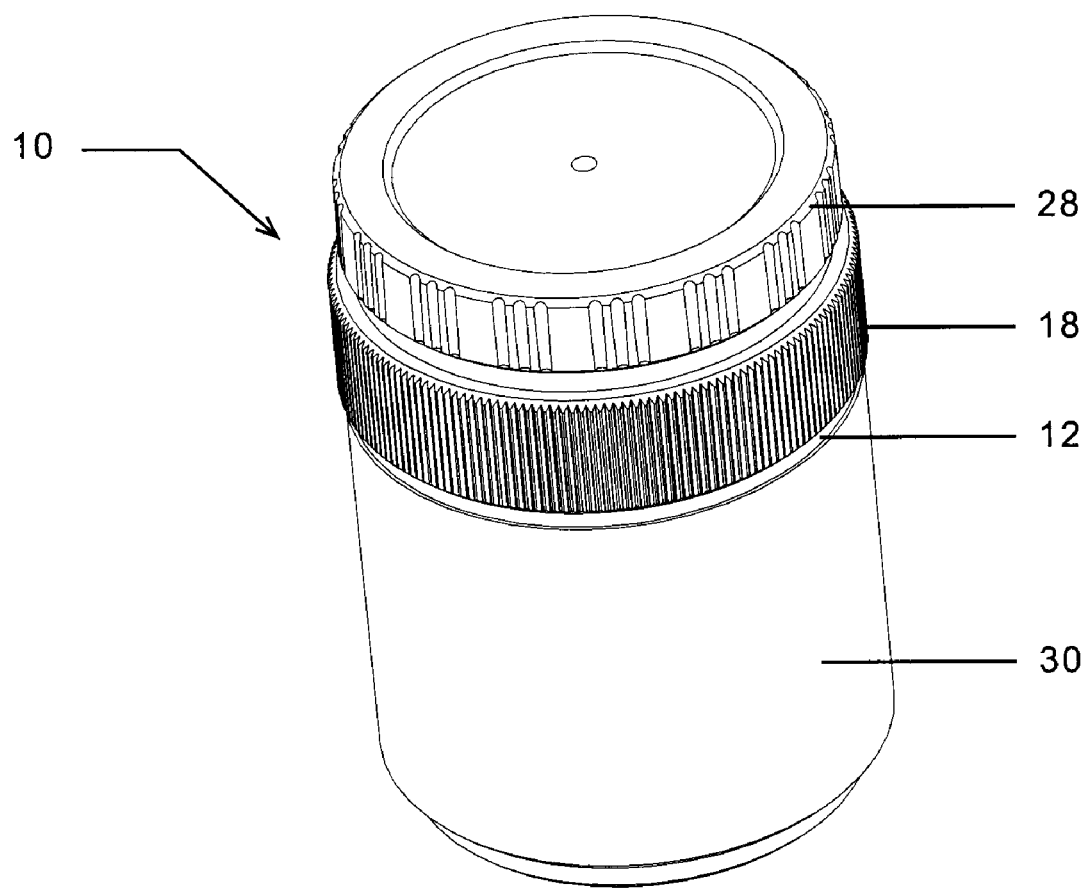
FIG. 9 is an isometric view of the loupe inserted within a protective sleeve.
Figure 10:
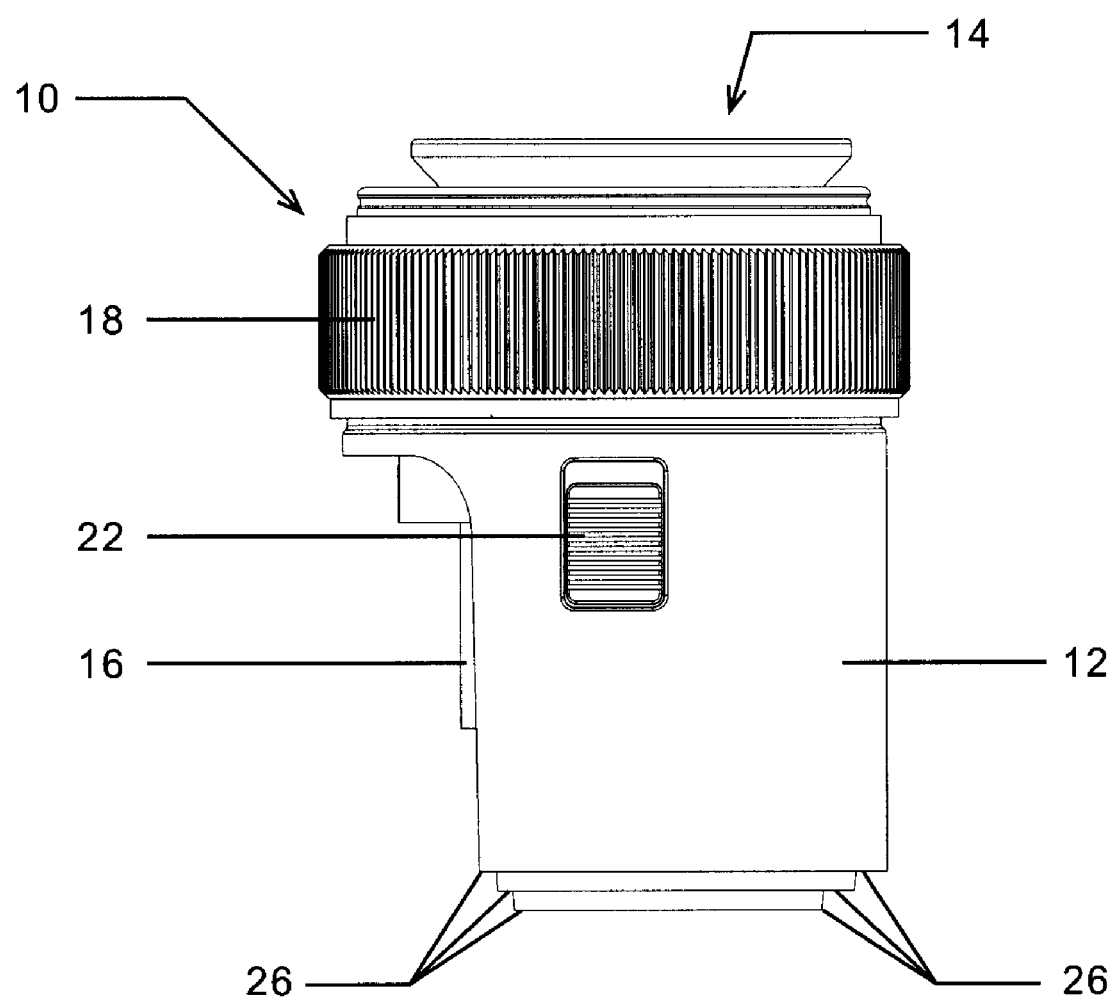
FIG. 10 is a right side view of the loupe of FIG. 4 with the eyepiece cap removed.

In the illustrated embodiment, a pair of battery powered lights 20 are mounted on an interior wall of housing 12 (one light 20 is visible in FIG. 3 and another light could be mounted on the opposite inner wall of housing 12). Lights 20 are activated by an on/off switch 22 (FIGS. 4 and 6). In one embodiment of the invention, lights 20 may be light emitting diodes (LEDs). A battery compartment 24 is provided on housing 12 for receiving a battery for powering lights 20 (FIGS. 5 and 6). The number, type and placement of lights 20 may vary without departing from the invention.

As shown in the drawings (e.g. FIG. 3), the lower portion of loupe 10 may include a plurality of stepped, annular rims 26 of varying diameters. Rims 26 are used for matingly coupling loupe 10 to camera lens mounts 4 of different sizes (i.e. the size of lens mounts 4 varies depending on the brand and model of camera 2).

Loupe 10 also includes a removeable eyepiece cap 28 for covering the upper portion of lens 14. Cap 28 protects lens 14 from damage when loupe 10 is not in use. Optionally, the lower portion of loupe 10 may also be received within a protective tubular sleeve 30 when not in use (FIGS. 2, 9 and 13-14). When loupe 10 is withdrawn from sleeve 30 and cap 28 is removed, a user may look through the interior of housing 12 as shown in FIG. 1(a) and described below.

An important feature of the present invention is the provision of a cut-out "access window" slot 32 formed in housing 12 at a circumferential portion thereof. Slot 32 is of a size sufficient to allow a user to insert a cleaning instrument, such as a brush or swab, through slot 32 to manually clean camera image sensor 6 while loupe 10 remains mounted on lens mount 4 (FIGS. 1(a), 16 and 18). Depending on the camera model and configuration, the position of lens barrel 16 may be adjusted (e.g. as shown in FIG. 12) to ensure sufficient room to insert a cleaning instrument through slot 32 without contacting lens 14. This feature allows loupe 10 to accommodate cameras having image sensors 6 located at different internal depths within the camera body.

In use, loupe 10 is withdrawn from case 30 and cap 28 is removed to expose lens 14. After the lens assembly (not shown) of camera 2 is removed to expose image sensor 6, loupe 10 may be placed on the lens mount 4 of camera 2 by coupling mount 4 to a rim 26 on housing 12 of a corresponding size (FIG. 1(a)). Lights 20 may be activated by turning on switch 22 to illuminate the internal structures of the camera including sensor 6. This allows a user to look through lens 14 mounted within housing 12 to easily visualize dust or other debris present on sensor 6. As will be apparent to a person a skilled in the art, lens 14 is a magnifying lens (the degree of magnification may vary, but may be on the order of 5×-7× for example).

Figure 16:
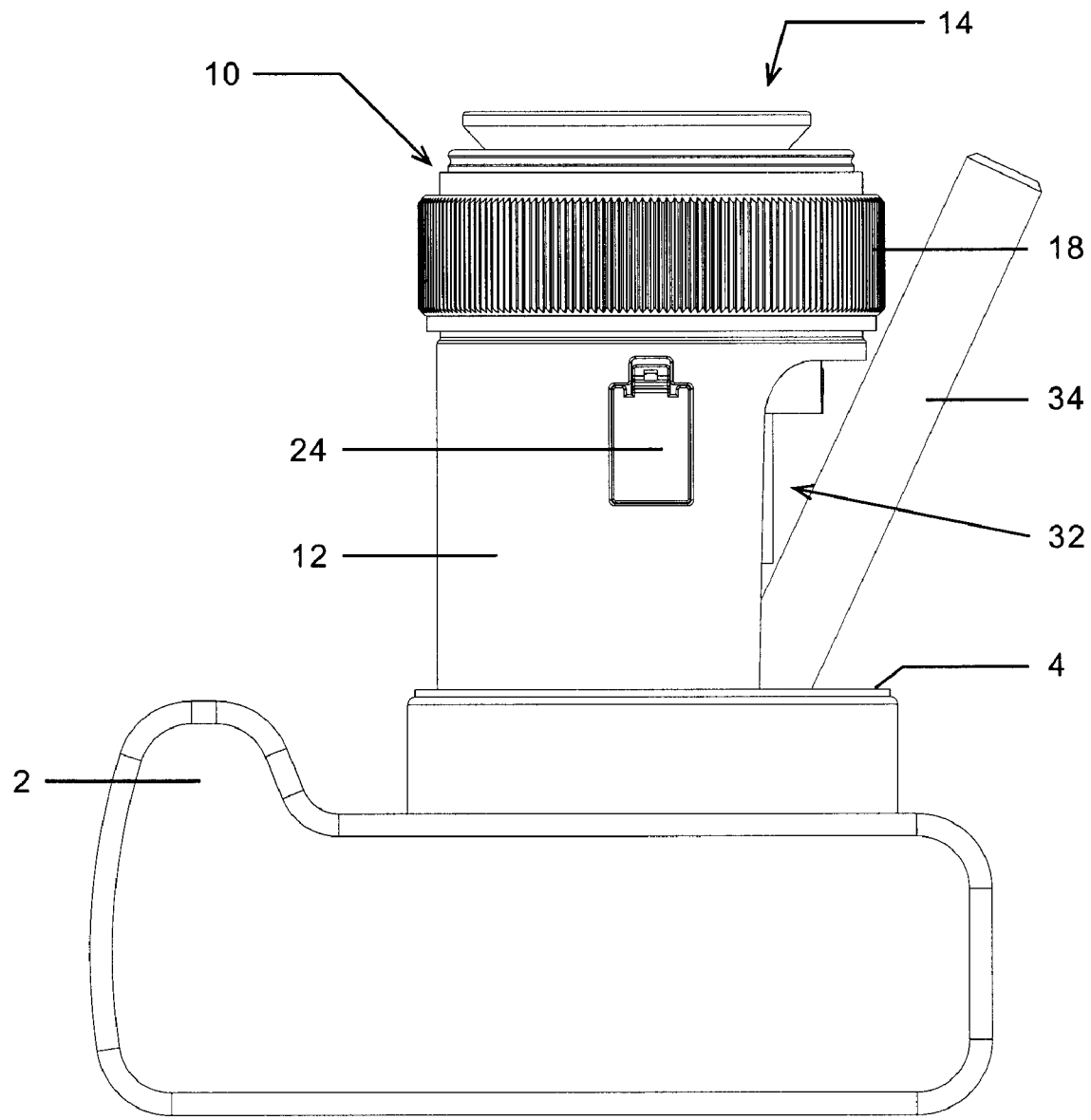
FIG. 16 is a left side view of the loupe of FIG. 15 showing the insertion of a cleaning instrument into the cut-out access window slot.
Figure 17:
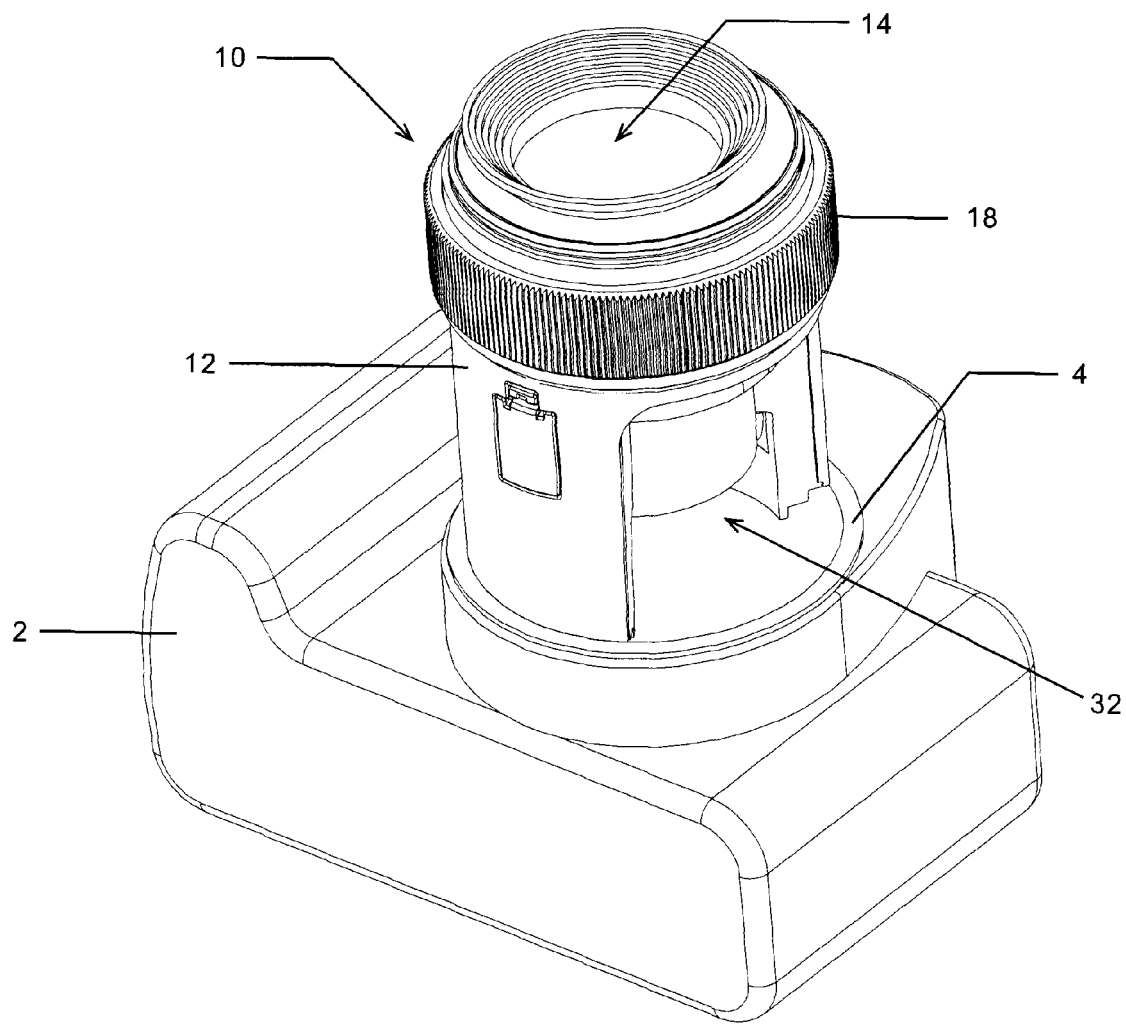
FIG. 17 is a front perspective view of the loupe of FIG. 15.
Figure 18:
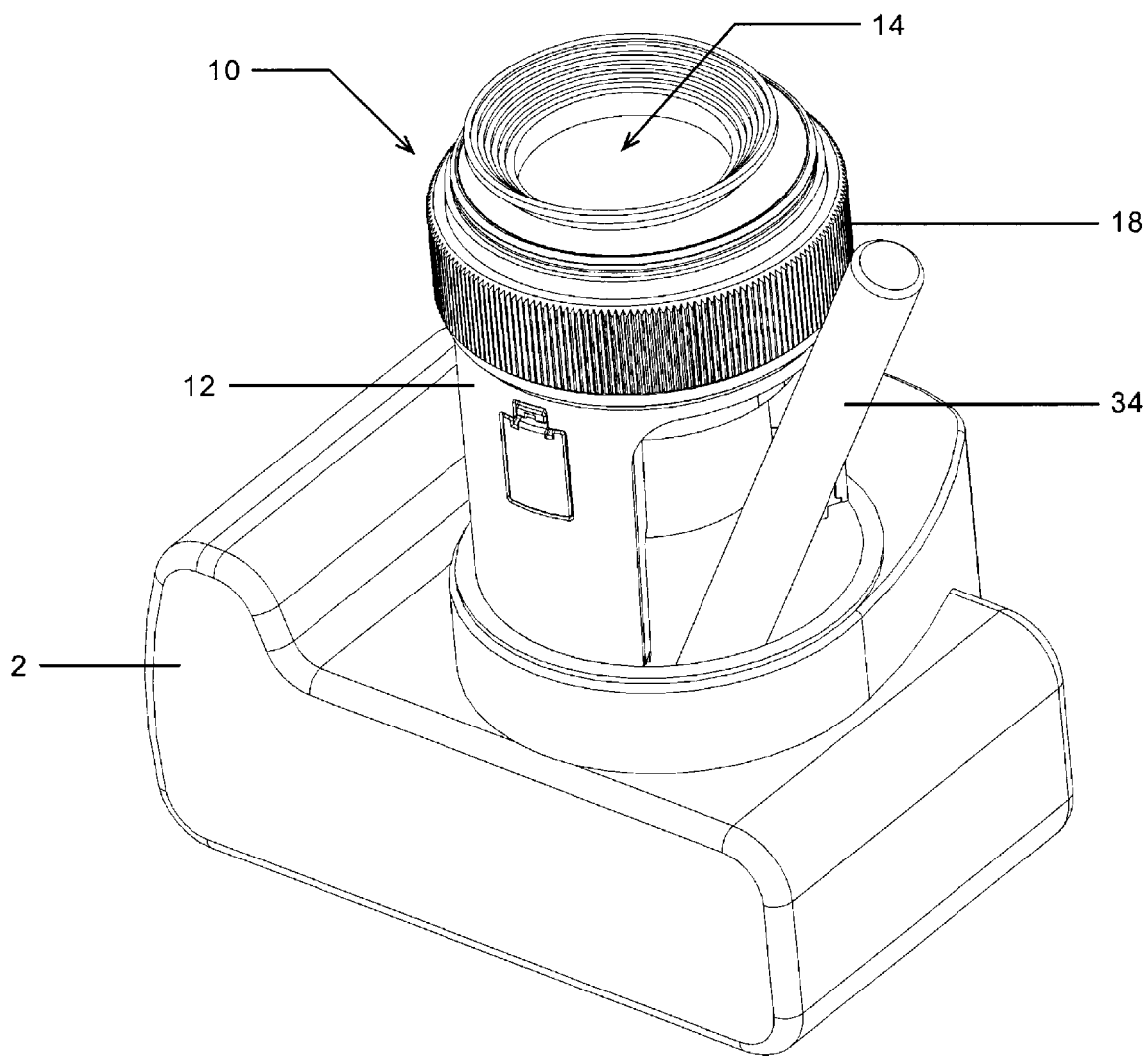
FIG. 18 is a front perspective view of the loupe of FIG. 16.
Figure 19:
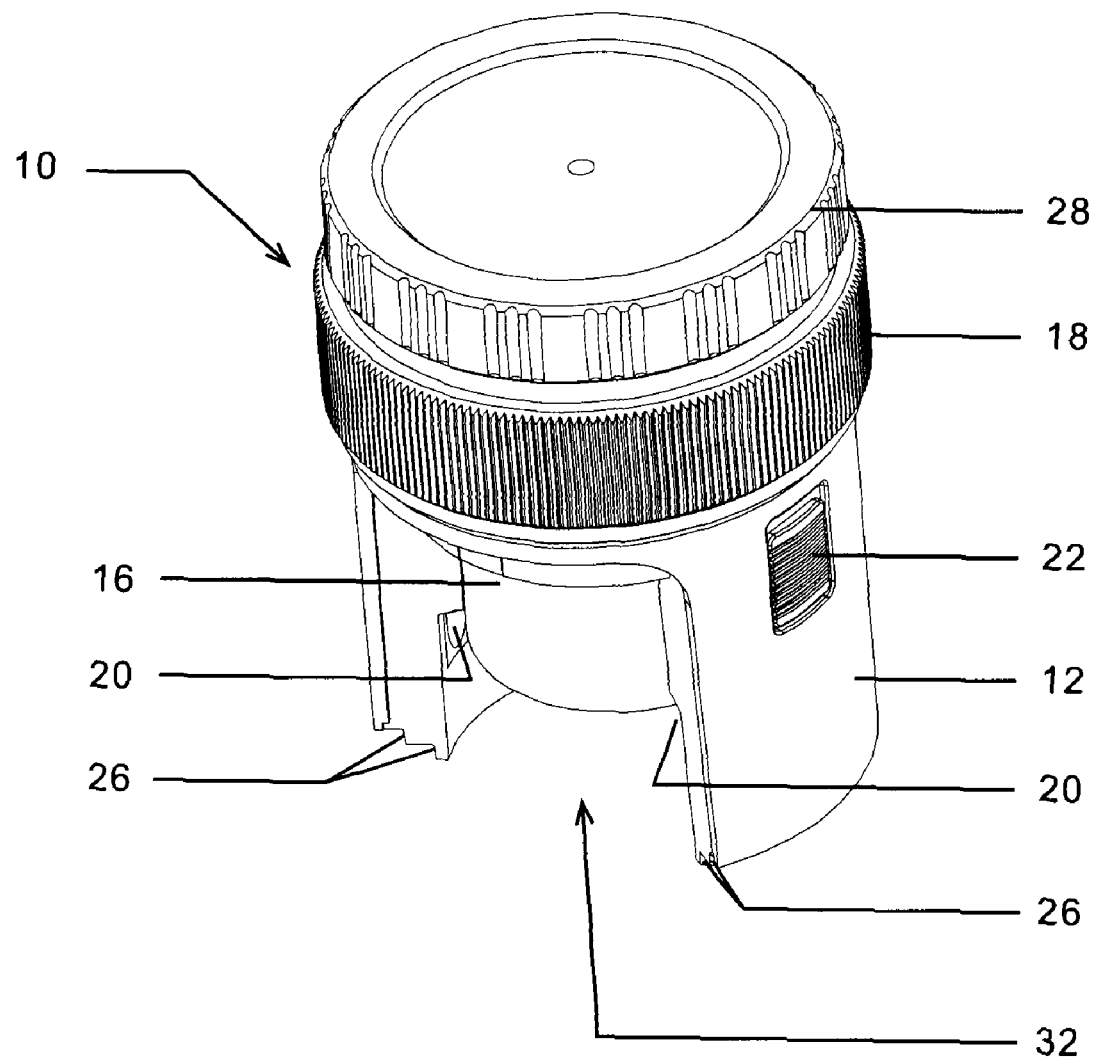
FIG. 19 is a further right, upper isometric view of the loupe with the eyepiece cap in place.
Figure 20:
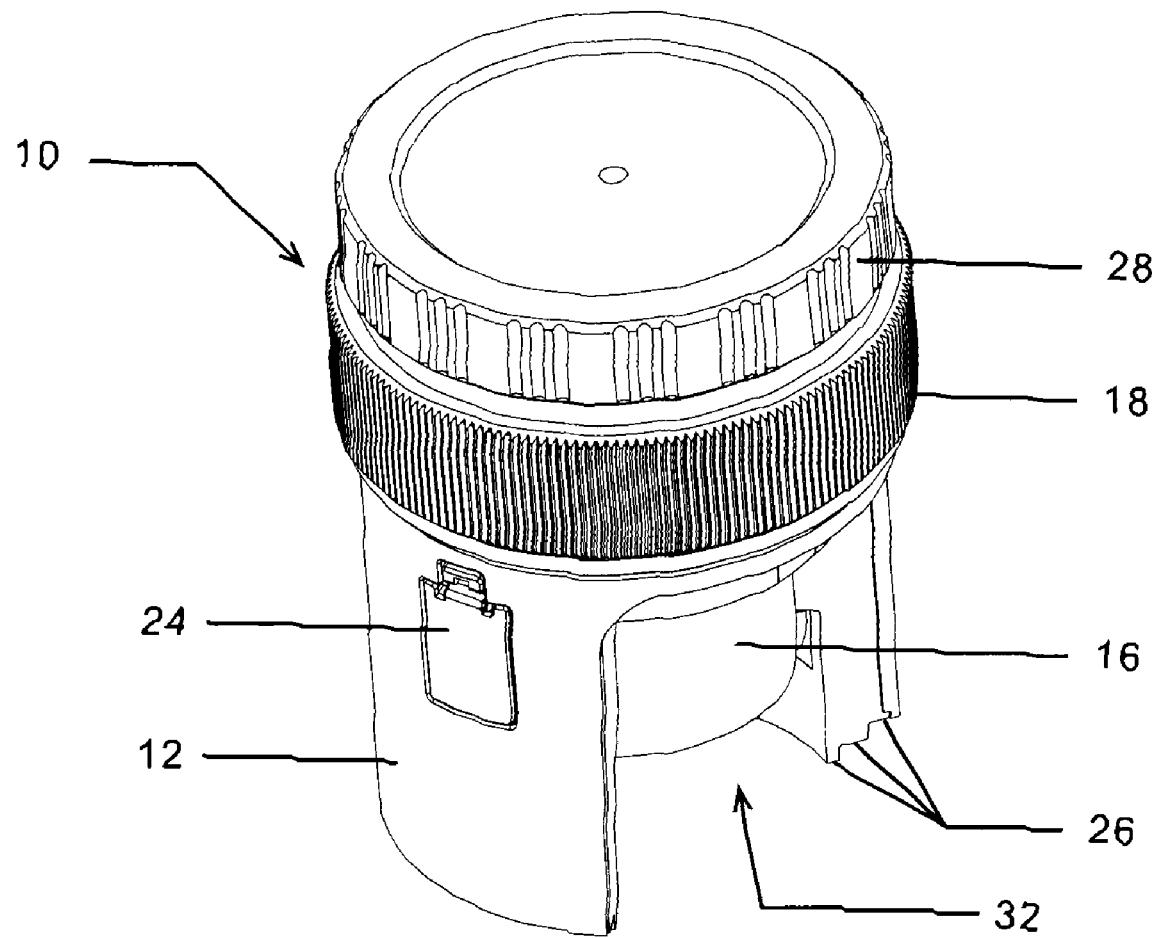
FIG. 20 is a further left upper isometric view thereof.
Figure 21:
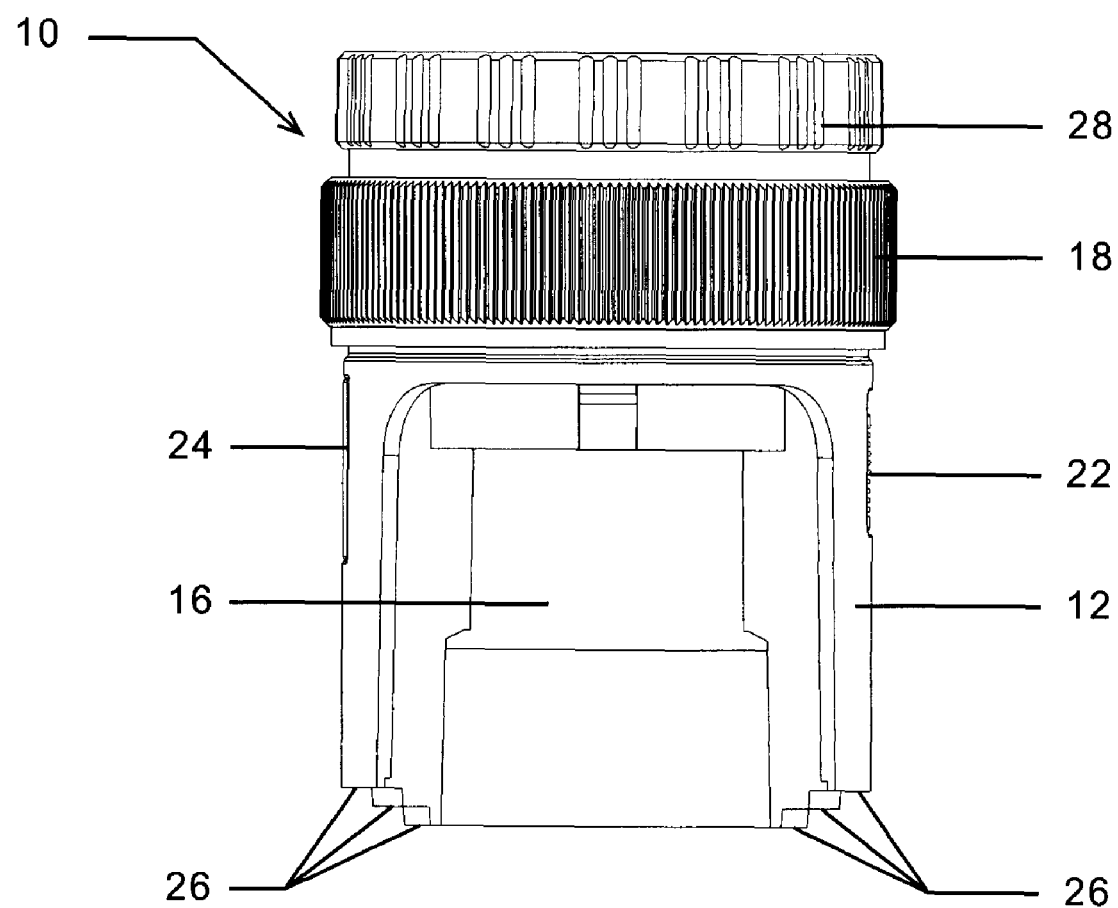
FIG. 21 is a front view thereof.
Figure 22:
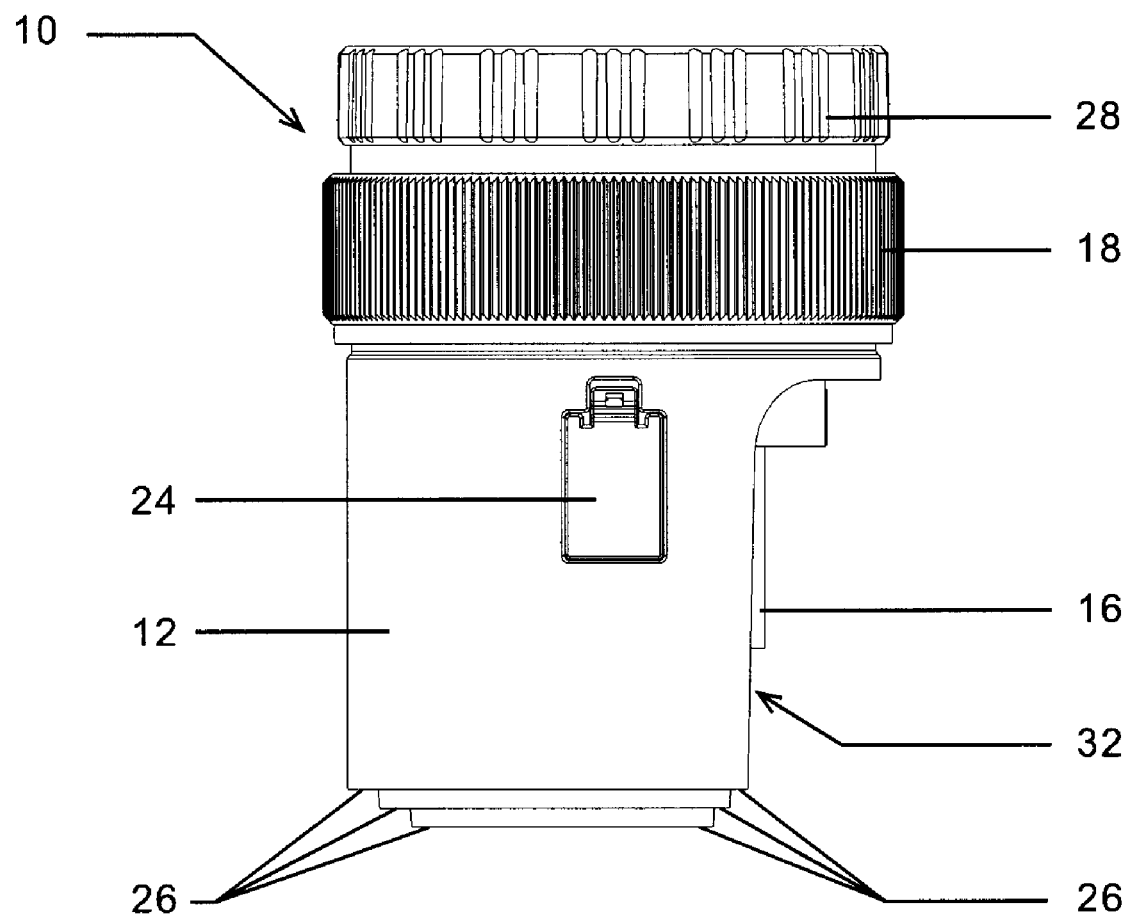
FIG. 22 is a left side view thereof.
Figure 23:
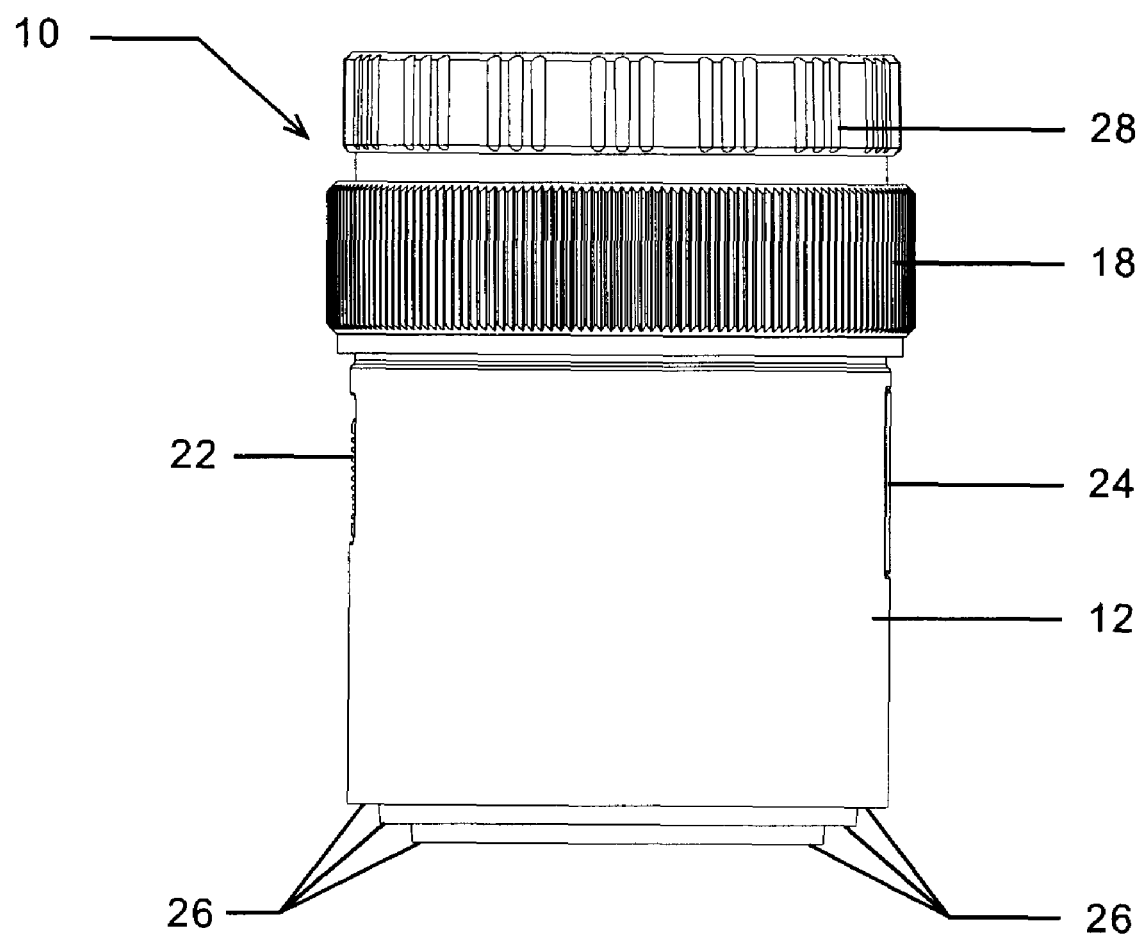
FIG. 23 is a rear view thereof.
Figure 24:
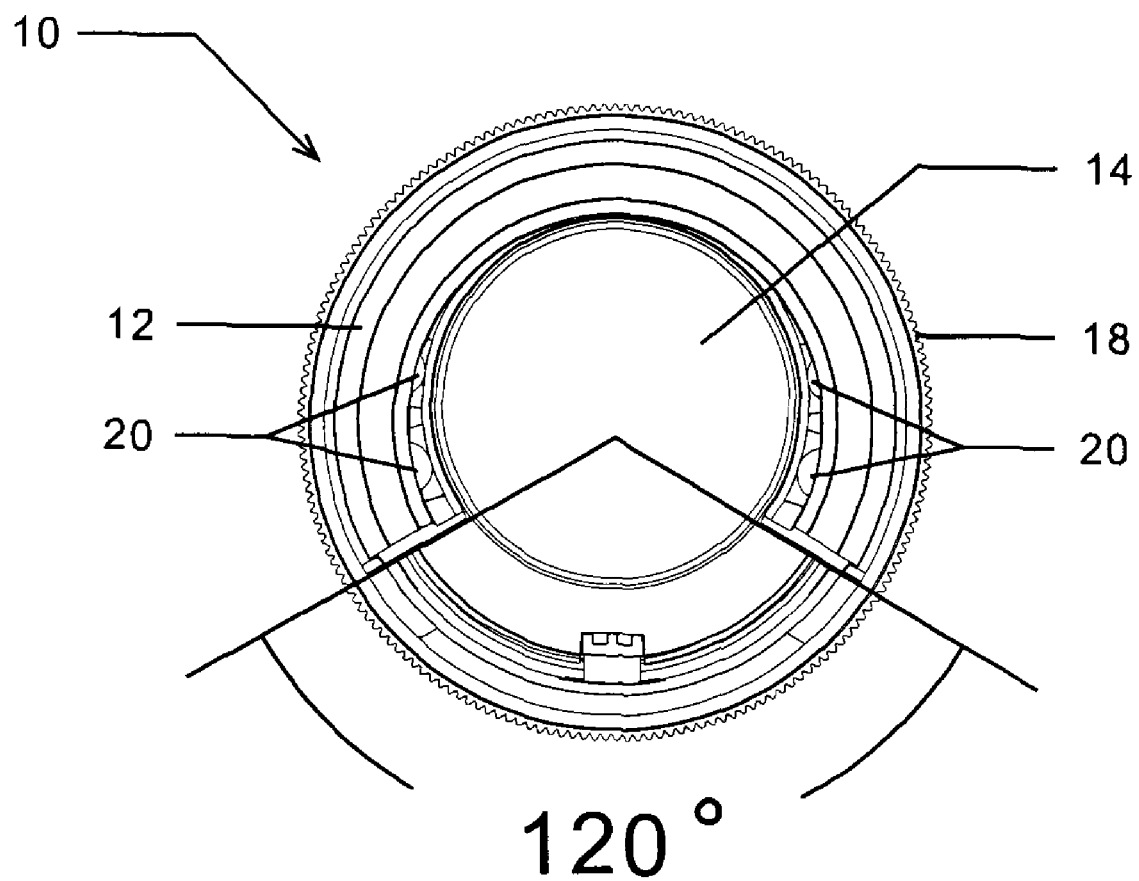
FIG. 24 is a bottom plan view thereof.

While viewing sensor 6, the user may then manually insert a cleaning instrument 34 through slot 22 to remove any dust or debris present on sensor 6 (FIGS. 1(a), 16 and 18). Thus the present invention enables the user to remove dust or other debris while simultaneously viewing the sensor 6 in "real time" through lens 14. Loupe 10 remains coupled to camera 2 during the entire viewing and cleaning procedure. As indicated above, the vertical position of lens 14 within housing 12 may be adjusted by raising or lowering barrel 16 by turning adjustment ring 18 if additional room for manipulating the cleaning instrument 34 is required.

As shown in the drawings, cleaning instrument 34 is a hand-held cleaning tool for manually engaging the image sensor 6. In one embodiment of the invention, cleaning instrument 34 may have an articulating joint for adjusting the angle of a lower portion of the instrument relative to an upper portion of the instrument.

Figure 2:
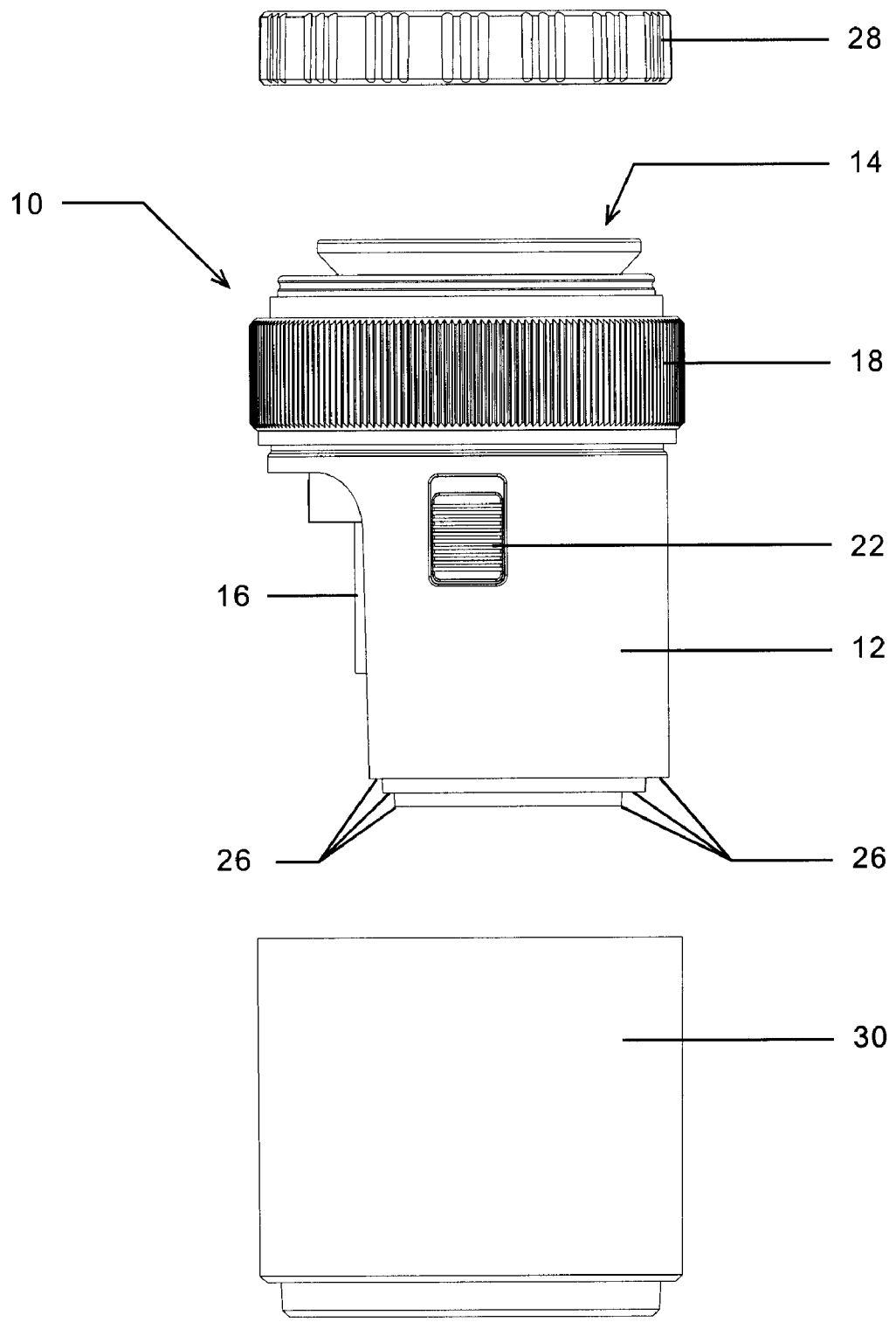
FIG. 2 is an exploded side view of the loupe and a protective sleeve for receiving the lower portion of the loupe housing.

After the camera image sensor 6 is sufficiently cleaned, loupe 10 is then removed and light 20 is deactivated by adjusting switch 22 to the off position. Loupe 10 may then be stored for future use by placing cap 28 on the upper portion of housing 12 and inserting the lower portion of housing 12 into protective case 30 (FIG. 2).

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. A device for use in conjunction with a camera having a lens mount and an image sensor, wherein said device comprises:
    (a) a housing having a lower portion sized to engage said lens mount;
    (b) a magnifying lens mounted within an interior of said housing; and
    (c) an illumination source mounted on said housing for illuminating said image sensor,
    wherein said housing comprises a cut-out slot to permit insertion of a cleaning tool therethrough, said device thereby enabling cleaning of said image sensor with said cleaning tool while said housing remains in engagement with said lens mount.

2. The device as defined in claim 1, wherein said housing is tubular and said slot is formed in a circumferential wall of said housing.

3. The device as defined in claim 1, wherein said magnifying lens is mounted within a barrel adjustably coupled within said interior of said housing to permit movement of said barrel relative to said housing.

4. The device as defined in claim 3, wherein said barrel is threadedly coupled to said housing and said device comprises an annular adjustment ring for adjusting the vertical position of said barrel within said housing.

5. The device as defined in claim 1, wherein said lower portion of said housing comprises a plurality of curved rims of varying diameter each sized for matingly engaging a lens mount of corresponding diameter.

6. The device as defined in claim 1, wherein said illumination source comprises battery-operated lights mounted within said housing and a switch for activating and deactivating said lights.

7. The device as defined in claim 1, further comprising a tubular sleeve for receiving at least a lower portion of said housing when said device is not in use.

8. The device as defined in claim 7, comprising a lens cap for removably covering an upper portion of said housing.

9. The device as defined in claim 2, wherein said slot is formed in a lower portion of said housing.

10. A kit comprising:
    (a) a device for use in conjunction with a camera having a lens mount and an image sensor, wherein said device comprises:
        (i) a housing having a lower portion sized to engage said lens mount, wherein said housing comprises a cut-out slot formed therein;
        (ii) a magnifying lens mounted within an interior of said housing, and
        (iii) an illumination source for illuminating said lens; and
    (b) a cleaning tool insertable through said slot for cleaning said image sensor when said housing is engagement with said lens mount.

11. The kit as defined in claim 10, wherein said housing is tubular and said slot is formed in a circumferential wall of said housing.

12. The kit as defined in claim 10, wherein said magnifying lens is mounted within a barrel adjustably coupled within the interior of said housing to permit movement of said barrel relative to said housing.

13. The kit as defined in claim 12, wherein said barrel is threadedly coupled to said housing and said device comprises an annular adjustment ring for adjusting the vertical position of said barrel within said housing.

14. The kit as defined in claim 10, wherein said lower portion of said housing comprises a plurality of curved rims of varying diameter each sized for matingly engaging a lens mount of corresponding diameter.

15. The kit as defined in claim 10, wherein said illumination source comprises battery-operated lights mounted within said housing and a switch for activating and deactivating said lights.

16. The kit as defined in claim 10, further comprising a tubular sleeve for receiving at least a lower portion of said housing when said device is not in use.

17. The kit as defined in claim 16, comprising a lens cap for removably covering an upper portion of said housing.

18. The kit as defined in claim 10, wherein said cleaning tool is a hand-held instrument for manually engaging said image sensor.

19. The kit as defined in claim 18, wherein said instrument comprises an articulating joint for adjusting the angle of a lower portion of the instrument relative to an upper portion of the instrument.

20. A method of cleaning an image sensor of a camera comprising:
    (a) providing an inspection device comprising a housing and a magnifying lens mounted within said housing, said housing having a slot formed therein;
    (b) coupling said inspection device to said camera;
    (c) inserting a cleaning tool through said slot while maintaining said device in engagement with said camera; and
    (d) cleaning said image sensor with said tool while viewing said image sensor through said magnifying lens.

21. The method as defined in claim 20, comprising illuminating said sensor during said cleaning.

22. The method as defined in claim 20, wherein said coupling comprises matingly engaging a lower portion of said housing to a lens mount of said camera.

\* \* \* \* \*